Figure 1:
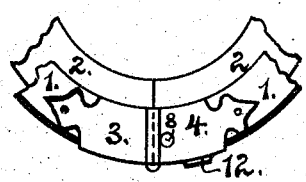

No. 781,432. PATENTED JAN. 31, 1905.
F. A. KLAPPAUF, C. WEINZAEPFLEN & A. RIBER.
COLLAR FASTENER.
APPLICATION FILED DEC. 7, 1903.

WITNESSES:
H. von Koenning
J. P. Hand

INVENTORS.
F. A. Klappauf.
Charles Weinzaepflen.
Alphonse Riber.
By H. F. Wallmann.
ATTORNEY No. 781,432. Patented January 31, 1905.

UNITED STATES PATENT OFFICE.

FERDINAND ANTON KLAPPAUF, CHARLES WEINZAEPFLEN, AND ALPHONSE RIBER, OF CHICAGO, ILLINOIS.

COLLAR-FASTENER.

SPECIFICATION forming part of Letters Patent No. 781,432, dated January 31, 1905.

Application filed December 7, 1903. Serial No. 184,141.

*To all whom it may concern:*

Be it known that we, FERDINAND ANTON KLAPPAUF, a citizen of the United States, and CHARLES WEINZAEPFLEN and ALPHONSE RIBER, subjects of the Emperor of Germany, all residing at Chicago, in the county of Cook and State of Illinois, have invented a new and useful Collar-Fastener, of which the following is a description, reference being had to the accompanying drawings, forming a part of this specification, in which corresponding numerals of reference in the different figures indicate like parts.

Our invention relates to collar-fasteners as are used in horse-collars for disconnecting and connecting the lower ends of their two symmetrical halves from and to each other, thereby facilitating the collar being put on and being removed from the horse-neck.

We preferably use this collar-fastener in a certain horse-collar invented by us and made the object of a patent application filed October 14, 1903, Serial No. 177,035; but we propose to use this collar-fastener also in all such other horse-collars as are constructed so as to permit and make desirable its adaptation. We furthermore employ our contrivance for numerous other purposes in place of coupling devices or locks of different construction.

The object of our invention is a very simple and at the same time rigid construction of a collar-fastener that can easily be operated and taken apart and is safely protected against accidental disconnection. We attain this object by the mechanism illustrated in the drawings, in which—

Figure 2:
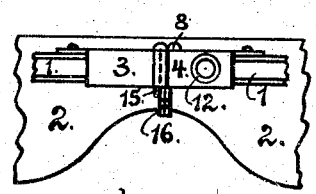

Figure 1 is a front view of the lower part of a horse-collar. Fig. 2 is a bottom view of the same, and Fig. 3 is a vertical section through the disengaged collar-fastener.

1 1 are two halves of a frame, preferably made of wood and generally called the "hames," of the horse-collar. 2 2 is the collar-body, forming a cushion between the shoulders of the horse and the hames. The lower end of each of the latter is inclosed in and rigidly connected to a metal casing 3 4, preferably made of brass or some other shining metal and decorated by ornaments. These casings 3 and 4, together with the hook 5, lever 6, spring 7, bolt 8, and bar 9, the latter being a part of the casing 3, constitute the collar-fastener or coupling device. The hook 5 and the lever 6, being pivoted on the bolt 8, are preferably forged in one piece.

Figure 3:
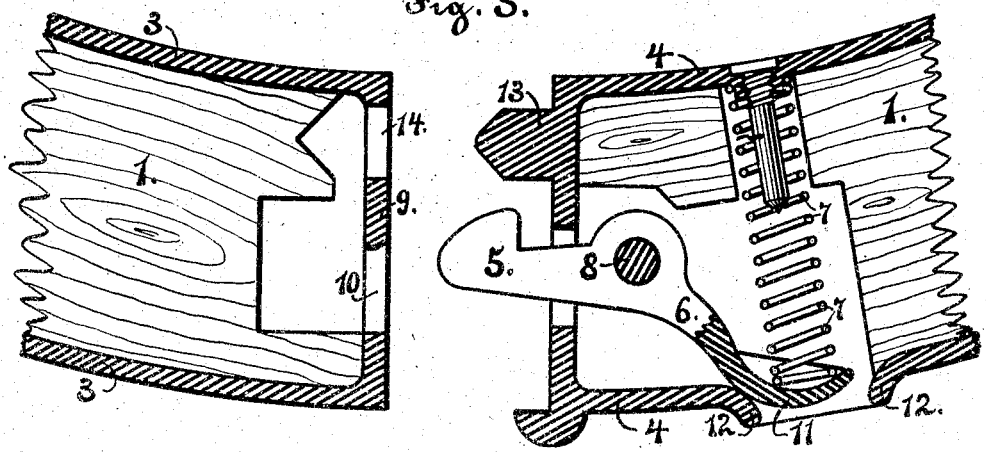

By moving the two casings 3 and 4, as shown in Fig. 3, toward each other the hook 5 strikes with its inclined plane against the lower edge of the bar 9, bends down into the hole 10, thereby lifting the lever 6 and compressing the spring 7. As soon as the two casings 3 and 4 are close to each other the hook 5 has advanced so far into the hole 10 as to bring its inclined plane out of contact with the bar 9. The spring 7 then presses down the lever 6, thereby lifting the hook 5, the nose of which occupies now the space in the cavity behind the bar 9. The collar-fastener is now engaged or locked. By pressing a thumb against the bent part 11 of the lever 6 and by simultaneously pulling the two hames apart the collar-fastener becomes unlocked again.

In order to prevent the collar-fastener becoming unlocked by accident, the bent part 11 of the lever 6 is protected by a projection 12, forming a recess for said bent part 11. This recess and hole inclosed by the circular projection 12 is large enough as to allow of the lever 6, hook 5, and spring 7 being removed through the same out of the casing 4 after the bolt 8 has been taken from its place. Naturally hook, lever, and spring can also be brought back through the same hole and recess into the position shown. This arrangement, together with the spiral spring 7, resting directly in the cavity formed on the upper side of the bent part 11 of the lever 6, makes the collar-fastener very simple and reliable.

Ribs 15 and 16, resting against each other when the collar-fastener is engaged, reinforce the same against bending by the strain from the drafts, and another reinforcement is afforded by providing the casing 4 with a projection 13, fitting into a corresponding hole 14 in the casing 3.

It will be understood that the bar 9 may be fastened instead of by means of the casing 3 in numerous other ways to one of the hames or to one of the symmetrical halves of the horse-collar or to any object that is to be provided with a bar 9 in order to connect the same by means of our coupling device to a second object carrying the hook 5 and the other parts of the mechanism, and the shape of the casing 4 may also be changed in any suitable way in order to meet the conditions and requirements of any special case of the application of our coupling device.

It will be observed that a feature of importance lies in so pivoting the latch in reference to the opening in the under side of the casing 4 that the thumb-piece on the casing will bear against the margin of the thumb-opening and be held there by the spring in convenient position for operation by the thumb, while at the same time the thumb-piece will be protected by the guard-flange 12, said flange projecting beyond the outer surface of the thumb-piece, so that the thumb-piece cannot be accidentally operated, while at the same time it substantially covers the opening in the casing. The latch is so positioned with respect to the opening that it may be inserted in the casing through the opening and may be withdrawn therefrom for repair or renewal by removing the pivot 8, the opening being large enough to permit the latch to pass through. It will be observed also that the position of the spring with respect to the opening is such that the spring also may be passed in through the opening and withdrawn therethrough at will.

We claim—

1. In a device of the class described, the combination of the hame-sections, a metallic casing inclosing the end of each of these sections, the end wall of one of the casings being provided with a pair of openings and the other wall being provided with a projection adapted to enter one of the aforesaid openings and an opening adapted to come opposite the other opening in the opposite casing, this last-named casing being provided with an opening in its under side, a latch pivoted in this latter casing at a point between the opening and the end wall of the casing and projecting out through the opening in said end wall, this latch being provided with an inwardly-extending thumb-piece resting against the margin of the opening in the under side of the casing and substantially closing the same, and an actuating-spring interposed between said thumb-piece and an adjacent part of the hame and arranged substantially in line with said opening, the latch and the spring being of such size that they may be inserted and withdrawn through said opening.

2. In a device of the character described, the combination of the two sections, the end of each of which is inclosed by a metallic casing, the abutting end walls of these casings being provided with coinciding openings and one of the casings being provided in addition with a thumb-opening in its under side, a latch pivoted within this latter casing and projecting through the opening in its end wall and adapted to enter the opening in the opposite end wall, this latch being pivoted at a point between said thumb-opening and the opening in the end wall and being provided with an operating or thumb piece bearing against the margin of said opening and substantially closing the same, and an actuating-spring inclosed in said casing and normally holding said thumb-piece over the opening.

3. In a device of the class described, the combination of the two hame-sections each of which is inclosed in a metallic casing, the end wall of one of the casings being provided with a pair of openings and the end wall of the other casing being provided with an opening coinciding with one of said opposite openings and with a projection adapted to enter the other of said opposite openings, one of said casings being provided with a marginal flange adapted to engage the edge of the other casing and assist in holding the parts in alinement and one of the casings being provided with a thumb-opening in its under side, this thumb-opening being provided with an outward-projecting marginal guard-flange, the latch being pivoted in its latter casing between said thumb-opening and the end wall of the casing and adapted to enter the opening in the opposite end wall, this latch being provided with a thumb-piece bearing against and substantially closing the thumb-opening, and an actuating-spring inclosed in the casing and arranged substantially in line with the thumb-opening, substantially as set forth.

FERDINAND ANTON KLAPPAUF.
CHARLES WEINZAEPFLEN.
ALPHONSE RIBER.

Witnesses:
H. von Domming,
J. P. Hand.